United States Patent [19]

Allen et al.

[11] 4,291,813

[45] Sep. 29, 1981

[54] CONTAINERS AND CLOSURES

[75] Inventors: David O. Allen, Wilmington; Harry A. E. Wombold, Dayton, both of Ohio

[73] Assignee: Buckeye Molding Company, New Vienna, Ohio

[21] Appl. No.: 100,099

[22] Filed: Dec. 4, 1979

Related U.S. Application Data

[63] Continuation-in-part of Ser. No. 878,416, Feb. 17, 1978, abandoned.

[51] Int. Cl.³ .................. B65D 41/34; B65D 41/36; B65D 41/38
[52] U.S. Cl. .................................... 215/252; 215/321
[58] Field of Search ............. 215/252, 321, 253, 258, 215/256; 220/266, 288

[56] References Cited

U.S. PATENT DOCUMENTS

| | | | |
|---|---|---|---|
| 1,230,178 | 6/1917 | Layng | 215/321 |
| 1,361,388 | 12/1920 | Layng | 215/321 |
| 2,054,012 | 9/1936 | Teller | 215/252 |
| 2,054,031 | 9/1936 | Conner | 215/252 |
| 3,074,578 | 1/1963 | Hester | 215/321 |
| 3,465,923 | 9/1969 | Konefar | 215/321 |
| 3,673,761 | 7/1972 | Leitz | 215/252 |
| 3,691,725 | 9/1972 | Cassinetis | 53/328 |
| 3,737,064 | 6/1973 | Patel | 215/252 |
| 3,944,102 | 3/1976 | Grau | 215/258 |
| 4,033,472 | 7/1977 | Aichinger | 215/258 |

Primary Examiner—George T. Hall
Attorney, Agent, or Firm—Dybvig & Dybvig

[57] ABSTRACT

A reusable closure for a container has a reversibly hinged annular pilferproof band integrally joined thereto by a relatively thin annular web serving as a hinge. When the parts are assembled, the band is pivoted about the web from a first position to a second, reversed position wherein it extends over a bead on the container. In the illustrated embodiments, the closure is a screw cap for a bottle and the band is joined about the base of the skirt of the cap. The bottle has a threaded neck for receiving the screw cap and the aforementioned bead about the neck. The band loosely interfits with the bead so that the cap can be initially unscrewed for removal without substantial restriction. As removal continues, the band so engages the bead that the connection between the band and the closure skirt stretches and then ruptures. Apparatus and methods for reversing the positions of a band are also disclosed.

23 Claims, 12 Drawing Figures

CONTAINERS AND CLOSURES

CROSS-REFERENCE TO RELATED APPLICATION

This is a continuation-in-part of application Ser. No. 878,416, filed in the U.S. Patent and Trademark Office on Feb. 17, 1978, titled Containers and Closures, now abandoned.

BACKGROUND OF THE INVENTION

The present invention relates to containers and closures and, in particular, to a container and a closure having pilferproof means connected between them.

Reusable closures having pilferproof bands for indicating tampering or for securing the closures to containers are known in the art. One example is a screw cap closure made from aluminum and having a security band at the base of the closure skirt. The band is swaged so that the bottom edge of the band engages the underside of a bead on the neck of a glass container or bottle. A weakened or scored line connects the band to the cap so that, when the cap is unscrewed, the security band is separated from the upper part of the cap and remains about the container bead. Unauthorized tampering is evident if the weakened line is broken.

It has been proposed to make similar caps from plastic. However, plastic is not easily deformed to be irremovably engaged to the underside of a container bead and the practice has been to apply heat and pressure to shape the closure bands to continuous beads. Molding a sufficient projection on the closure to engage the container bead often presents molding difficulties because of the required undercuts in the mold, and secondary operations, such as shaping the plastic by heat and pressure, are expensive and time consuming.

SUMMARY OF THE INVENTION

In accordance with the present invention, a pilferproof band is hingedly connected to a closure so that it may be pivoted to interfit a projection on a container. In a preferred embodiment, the pilferproof band is integrally joined by a relatively thin, annular, connecting web to the skirt of a molded plastic screw cap or closure. The band is molded one-piece with the cap in a first position and, during assembly of the cap onto a container, a simple downward force against the band causes the band to pivot about the connecting web to a second position. The container has a projection, preferably in the form of a circumferentially extending bead or the like, and the pilferproof band has a hook-like portion shaped to loosely interfit the container bead when the band is in the second position. The annular web joining the band to the closure skirt preferably comprises a resilient plastic material which serves both as a hinge about which the band is pivoted from its first position to its second position and as a weak connector which can be easily ruptured when the cap is to be removed from the container. When the cap is removed or tampered with, the then ruptured web will provide a readily noticeable indication.

The pilferproof band is designed to interfit the container bead in such fashion that it will not substantially resist initial rotation or unscrewing movements to begin removal of the cap. Therefore, an initial large force or torque is not needed for removal. With continued rotation of the screw cap, the pilferproof band will become so engaged with the container bead that further axial motion of the band will be impossible. The resulting axial movement of the cap relative to the container bead will cause the connecting web to stretch and ultimately rupture, leaving only the band on the container. That rupture, or tearing, will tend to be slightly uneven and irregular along the web and will be readily noticeable. A larger force or torque may be needed to effect rupture than is required for simply unscrewing the cap, but the container and closure screw threads provide a mechanical advantage to assist in causing rupture. Accordingly, great strength is not required to remove the cap from the container.

One particular advantage of the present invention is the requirement of only the previously mentioned downward force to move the reversible band to its second, container-engaging position. In accordance with this invention, apparatus and methods are provided for applying force to the band either before or after the screw cap is threadedly received on the container.

DESCRIPTION OF THE PREFERRED EMBODIMENTS

Figure 1:
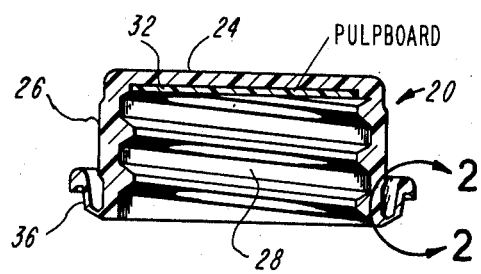
FIG. 1 is a transverse sectional view of a closure made in accordance with the present invention.
Figure 2:
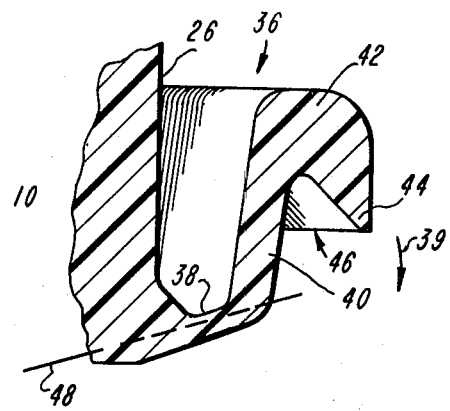
FIG. 2 is an enlarged sectional view of the portion of the closure generally enclosed by the arcuate line 2—2 in FIG. 1.
Figure 3:
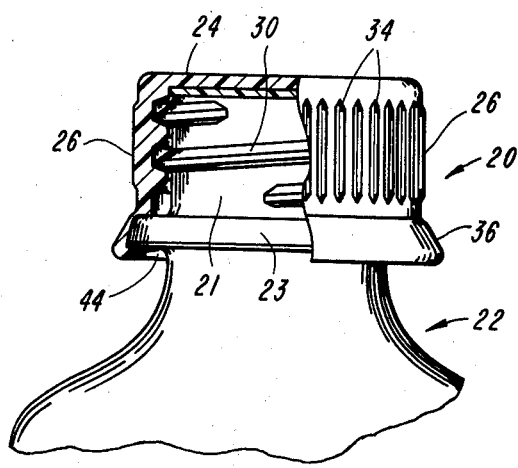
FIG. 3 is an elevational view, with portions broken away, illustrating the closure of FIG. 1 with the reversible band in its second, reversed position and in engagement with the bead of a bottle.

With reference to FIGS. 1 through 4, a first embodiment of the present invention is shown in the form of a screw cap 20. The cap 20 is molded in one piece from a suitable resilient plastic, such as high density polyethylene, and is adapted to be screwed onto the threaded neck 21 of a bottle 22 (FIG. 3). The bottle is preferably plastic but may be made from any suitable material, such as glass, and includes a bead 23 surrounding the neck 21.

The cap 20 includes a top 24 for covering the bottle opening at the top of the neck 21 and a skirt 26 circumferentially depending from the top 24. The inside surface 28 of the skirt is helically grooved or threaded to engage threads 30 on the neck 21 of the bottle. Fitted on the inside of the top 24 is a disc-like liner 32, made of pulpboard, cork or other suitable material, which bears against the top or rim of the neck about the bottle opening and seals the bottle when the cap is in place on the bottle as shown in FIG. 3. The outside of the skirt 26 has knurls 34 which provide a gripping surface to assist in screwing the cap on or off the bottle.

Integrally joined at the base or bottom of the skirt 26 is an annular, reversible band 36, which is shown in FIGS. 1 and 2 in a first position as it would appear shortly after the closure is molded. Referring to the enlarged view of the band 36 in FIG. 2, the band can be seen as joined to the skirt 26 by a circumferentially extending web 38. As will be more fully described later, the web 38 is sufficiently thin to rupture upon rotary and axial movement of the skirt 26 relative to the band 36, but also is sufficiently resilient to avoid tearing upon angular or pivotal movement of the band 36 about the web in the direction of the arcuate arrow 39.

Referring still to FIG. 2, the band 36 comprises a generally cylindrical wall section 40 that extends upwardly and away from the web 38 and partially alongside the skirt 26 in the first, "as molded" position of the band. At the end of the wall 40, opposite web 38, is a thickened portion 42. The thickened portion 42 may terminate sharply at a pointed end or projection 44 which extends generally radially outwardly from the band when the band is in its first position. The band 36 is movable about the web 38 in the direction of arrow 39 from the aforementioned first position to a second, reversed position illustrated in FIG. 3, where the projection 44 extends generally inwardly and may engage the underside of the bead 23. The projection 44 cooperates with the wall 40 to form a hook portion, generally designated 46, to extend over the bead 23 so that the band 36 may be irremovably assembled onto the bottle 22.

As will be more fully described later, the movement of the band 36 from its first position to its second position can be accomplished by a simple downward force against the band. When looking at any point along the web 38, such as that seen in FIG. 2, there is an imaginary line, illustrated at 48, at that point through the web 38 which comprises a "point of equilibrium" and, once the aforementioned downward force moves the band 36 past that point, i.e., the line 48, the band itself will tend to "flip" or otherwise move, by its own resiliency, to the aforementioned second, reversed position below the line. It has been found that the greater the mass of the band at the thickened portion 42, the greater the tendency of the band to be angularly spaced substantially the same distance below the line 48 in its second position as it is angularly spaced above the line 48 when in its first position.

Once the projection 44 of the band 36 is hooked under the bead 23, the band 36 is substantially permanently assembled on the bead and cannot be removed without a great deal of effort and, in all likelihood, noticeable damage to the cap.

When the cap 20 is fully assembled on the bottle, the cooperating cap and bottle screw threads maintain a seal between the linear 32 and the rim of the neck of the bottle until a deliberate rotary motion is imparted to unscrew and remove the cap from the bottle. Also when the cap is fully assembled on the bottle, the projection 44 of the band 36 is preferably spaced below the container bead 23 by a few thousandths of an inch, such spacing being too small to accurately illustrate in the drawing. The hook portion 46 thus either does not engage, or only lightly engages, the container bead 23. Accordingly, initial rotation to unscrew the cap is not substantially resisted by engagement of the band 36 with the bead 23. However, as the cap is further unscrewed, both axial movement of the band 36 along the neck 21 and rotation of the band 36 are resisted by its engagement with bead 23. Consequently, the upward axial and rotary movements of the cap 20, when unscrewed, will cause the web 38 to rupture under both tension and shear forces until the skirt 26 is completely separated from the band so that the cap 20, without the band 36, can be completely unscrewed and removed from the bottle as illustrated in FIG. 4.

The web 38, as illustrated in FIG. 2, has a reduced cross sectional area and is thinner than the adjoining portions of the skirt 26 and wall 40 so that, when the band 36 is in its first position and receives an axial, downward force, the band 36 will pivot only at the web 38 about the base of the skirt 26 to arrive at its second position. The web 38 is also sufficiently thin that it will readily rupture when the band 36 is in engagement with the bead 23 and the cap 29 is deliberately unscrewed, as described above. However, because of the forces that combine to rupture the web 38, it need not be so thin as to be likely to rupture during shipment and normal handling of the capped bottle 22.

Because of the natural resiliency of the plastic at the web 38, the web 38 will tend to stretch in both tension and shear after the axial movement of the cap is sufficient that the engagement of the band 36 with the bead 23 significantly restricts further movement of the band 36. Therefore, the web 38 will not rupture until a deliberate and substantial rotational movement is imparted to the cap. This is not to say, however, that deliberate removal of the cap will be difficult. Because the band 36, at most, only loosely engages the bead 23 when the cap is fully assembled on the bottle, the cap 29 freely rotates upon initial and deliberate unscrewing. When thereafter the band 36 becomes tightly engaged with the bead 23, the torque that must be manually applied to cause the aforementioned stretching and ultimate rupture of the web 38 is not great because the manual torque is assisted by the mechanical advantage provided by the screw threads. The formation of the band 36 so that it does not tightly engage the bead 23 when the cap is fully assembled on the bottle, thereby permitting relatively unrestricted initial unscrewing rotation of the cap 20, substantially contributes to the ease with which the web 38 may thereafter be stretched and ruptured. Removal of the cap is practically as easily accomplished as is removal of the cap when being reused following removal of the band 36.

Figure 4:
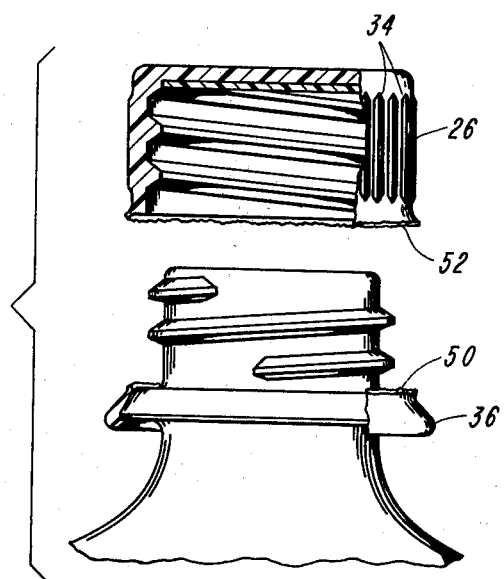
FIG. 4 is an exploded elevational view, with portions broken away, of the closure and bottle shown in FIG. 3 after removal of the closure from the bottle.

As seen in FIG. 4, when the cap 20 does rupture along web 38, the resulting edge 50 along the top of the band 36 and the resulting edge 52 along the base of the skirt 26 will tend to be irregular and uneven and, hence, readily noticeable. Thus, if the cap 20 has been tampered with so that the web 38 ruptures, the seal at the linear 32 thereby being broken, a visible indication is given. The irregularity of the tear along the web 38 is generally attributable to the width of the web 38 between the base of the skirt 26 and the wall 40 of the band 36. Since this entire width is uniformly thin, tearing of the web 38 may occur anywhere along the width and will tend to be irregular and uneven as described.

Here it may be noted that the outer, lower edge of the container bead 23 is preferably quite sharp so that the lower surface of the bead 23 forms a continuous flat shoulder for reliably resisting upward movement of the band projection 44. After the cap is first assembled on the bottle, the band 36 covers the sharp edge of the bead 23, even after the cap is subsequently removed, because the band remains secured to the bead. Also it may be noted that the band 36 should be so designed that its hook portion 46 will not tightly engage the bead 23 within all tolerance limits for the manufacture of both the bead 23 and the band 36. If the band 36 tightly engaged the bead 23 before commencement of the unscrewing of the cap, substantial torque would be required to cause the web 38 to stretch and rupture, and the torque would have to be applied without the assistance of the mechanical advantage provided by the screw threads. In such event, it could be quite difficult to remove the cap.

Figure 5:
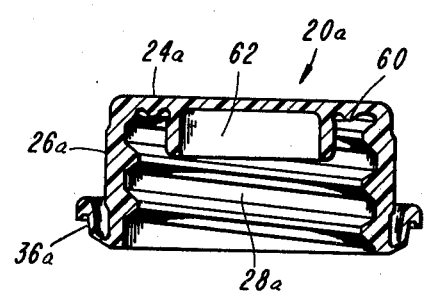
FIGS. 5 and 6 are transverse sectional views illustrating alternate types of closures made in accordance with the present invention.
Figure 6:
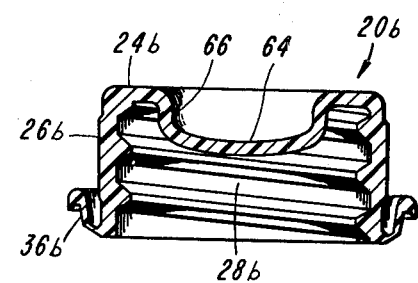

FIGS. 5 and 6 illustrate alternate types of closures having reversible bands similar to the band 36 shown in FIGS. 1 through 4. In FIG. 5, a cap 20a has a top 24a, a skirt 26a with a threaded inside surface 28a, and a reversible band 36a shown in its first, "as molded" position. Rather than having a sealing liner as in the first embodiment, the cap 20a includes a small bead 60 on the inside of the top 24a for providing a seal between the cap and the rim about the top of the neck of the bottle. In addition, the cap 20a includes a cylindrical wall 62 depending from inside the top 24a and forming a stopper to enter the bottle opening and also seal the bottle.

In FIG. 6, a cap 20b has a top 24b, a skirt 26b with a threaded inside surface 28b, and a reversible band 36b shown in its "as molded" position. To accomplish a seal between the cap 20b and a bottle, the top 24b includes a stopper-like, circular depression 64 for entering the bottle opening and having a substantially vertical, cylindrical side wall 66 which sealingly engages the inside surface of the neck of the bottle.

FIGS. 7 through 12 illustrate two alternate methods for applying the cap 20, shown in FIGS. 1 through 4, to the bottle 22. In both methods a first tool member 70 is used to apply the cap. The tool member 70 has a bore 71 with a diameter substantially the same as the outer diameter of the cap 20. A circular margin 72 about the opening of the bore 71 is beveled, having approximately the same slope, for reasons which will become apparent, as the security band 36 when in its second, reversed position. Although not shown, suitable conventional driving means are provided for rotating the tool member and moving it in a direction along the axis of the bore.

Figure 7:
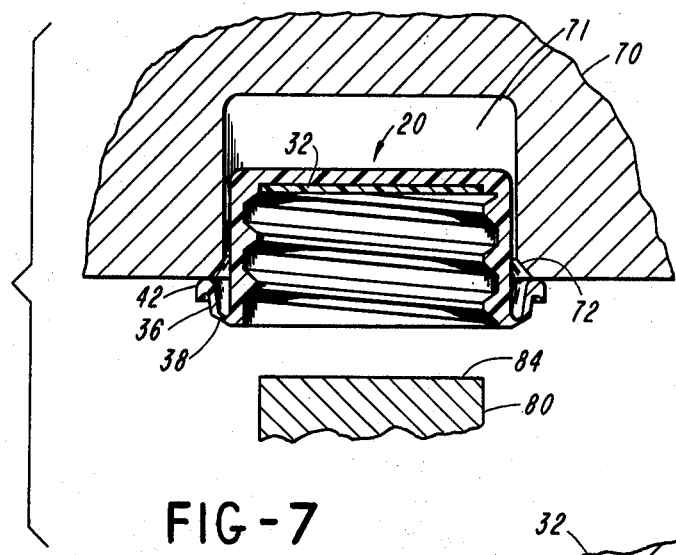
FIGS. 7 through 9 are sectional views illustrating the closure of FIG. 1 and an apparatus and method for applying the closure to a bottle.
Figure 8:
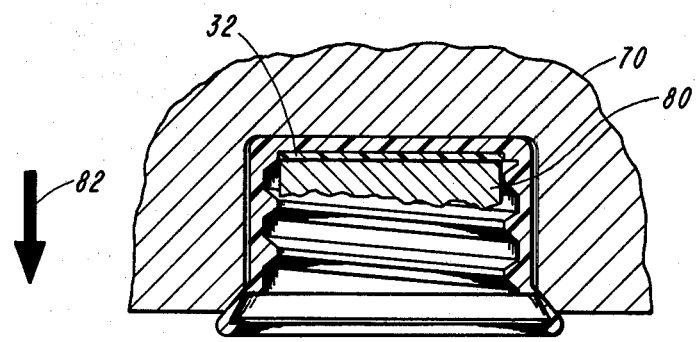
Figure 9:
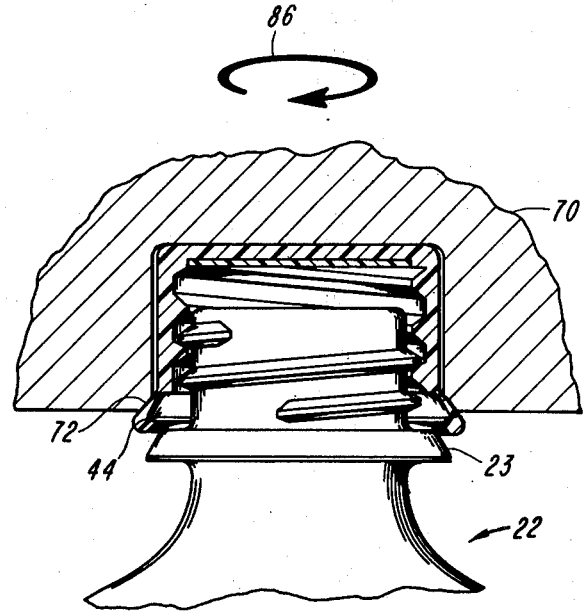

In the first method illustrated in FIGS. 7 through 9, the tool member 70 first receives the cap 20 within the bore 71 as shown in FIG 7. A second tool member 80 is axially aligned with the cap 20 beneath the first tool member 70. The tool member 80 may be cylindrical and is sized to fit inside the cap 20. The tool member 70 and cap 20 are then moved downwardly toward tool member 80 in the direction illustrated by arrow 82 (FIG. 8) so that the liner 32 contacts the top surface 84 of the tool member 80. With continued downward movement of the tool member 70 in the direction of arrow 82, and with the cap 20 now held against movement by the second tool member 80, the tool member 70 will bear against the thickened portion 42 of band 36 and force the band 36 to pivot about the web 38 until tool member 70 and the band reach the position shown in FIG. 8. The tool member 80 is then removed and the bottle 22 located beneath the tool member 70. The tool member 70 is then rotated in the direction illustrated by arcuate arrow 86 (FIG. 9) in order to screw the cap 20 onto the bottle. The beveled margin 72 bears against the band 36 as the cap is rotated so that when the projection 44 at the end of the band reaches the bead 23 (FIG. 9), it will be forced to stretch over the bead 23. With continued downward movement, the projection 44 will then recover from its stretched condition to be extended below the bead 23, as previously described with reference to FIG. 3.

Figure 10:
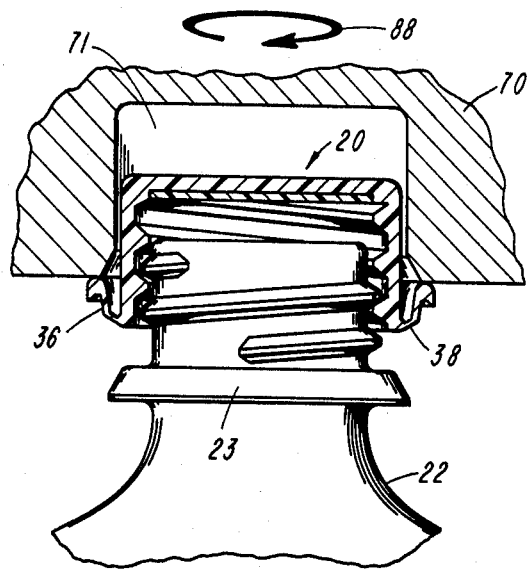
FIGS. 10 through 12 are similar to FIGS. 7 through 9 and illustrate an alternate method for applying the closure to a bottle.
Figure 11:
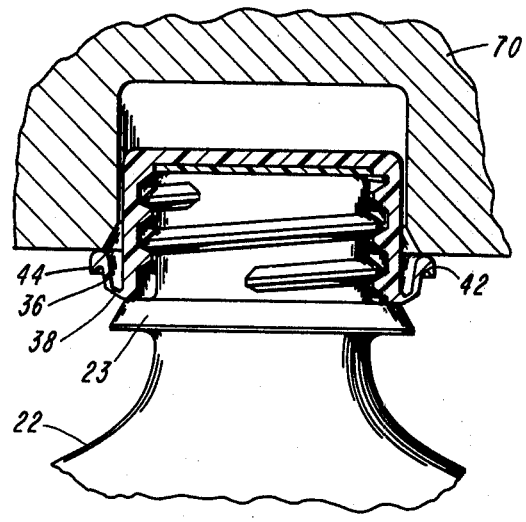
Figure 12:
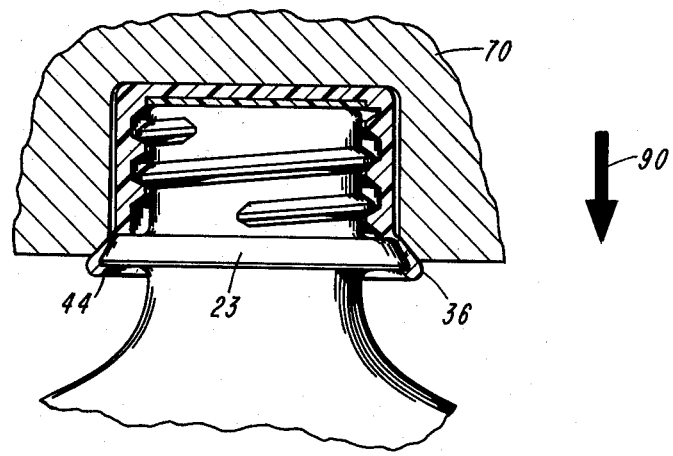

An alternate method for applying the cap 20 to the bottle 22 is illustrated in FIGS. 10 through 12. After the cap 20 is received within the bore 71 of tool member 70, the bottle 22 is located directly beneath the cap. The tool member 70 and the cap are then rotated, as indicated by the arcuate arrow 88, so that the cap is screwed onto the bottle. When the cap is fully screwed onto the bottle and in the position shown in FIG. 11, with the band 36 still in its first, "as molded" position, the tool member 70 is moved downwardly, as indicated by the arrow 90, so that the tool member 70 bears against the thickened portion 42 of the band 36, to pivot the band 36 about the web 38 so that the projection 44 moves to a position underneath the bead 23 (FIG. 12).

After the cap 20 has been applied and the band 36 extended over the bead 23 using either of the described methods, it would be extremely unlikely that one could, without noticeable damage to the band 36, stretch or reversely pivot the band 36 away from the bead to enable surreptitious removal of the cap. The only practical way to remove the cap 20 without mutilating the band 36 is to unscrew the cap 20 and tear the cap away from the band 36 along the web 38.

It should be apparent from the foregoing description that a reversible band integrally joined to a closure provides a convenient and tamperproof means for securing the container to a closure. The band can be easily reversed to its securing position without the need of numerous tools or procedures. After the closure and the container are secured, the closure in the disclosed embodiments, is, as a practical matter, removable only by readily noticeable tearing, either along the web joining the band to the container, or, if desired, along a weakened tear line elsewhere on the closure. It should also be apparent that numerous types of closures other than those disclosed could be made with a reversible band in accordance with the present invention.

Those familiar with the design of screw caps will appreciate that the seal to the container is obtained by the pulpboard 32 or other resilient member at the open end of the container neck. FIGS. 3, 11 and 12 show the closure skirt engaged with the container bead. This may or may not occur in actual practice. If contact does occur, the parts should be designed to cause the seal to be effective before the skirt bottoms out on the bead.

Although the preferred embodiments of this invention have been described, it will be understood that various changes may be made within the scope of the appended claims.

Having thus described our claims, we claim:

1. In a closure and container combination:
   a closure and a container having cooperating screw threads; and a circumferentially extending band integrally joined by a relatively thin connecting portion to one of said closure and container for pivotal movement about said connecting portion, said band having a first position and, when pivoted from said first position, a second, reversed position so that when said closure and container are assembled, said band in said second position secures said one of said closure and container to the other of said closure and container.

2. The combination of claim 1 wherein said band and said other of said closure and container include interfitting means to prevent removal of said band from said other of said closure and container when said closure and container are assembled and said band is pivoted to said second position.

3. The combination of claim 1 wherein said other of said closure and container includes a circumferentially extending bead, and wherein said band includes means for interfitting said bead when said band is in said second position.

4. The combination of claim 3 wherein said interfitting means comprises a hook portion on said band extending over said bead and thereby locking said band to said bead.

5. The combination of claim 4 wherein said hook portion includes a thickened portion of said band.

6. The combination of claim 4 wherein said closure includes a top and a circumferentially extending skirt depending from said top, wherein said band is joined to the base of said skirt, and wherein said container has a closure-receiving, open end, and said bead is on said container near said open end.

7. The combination of claim 4 wherein said closure includes a top and a circumferentially extending skirt depending from said top, wherein said band is joined to said skirt, wherein said container includes a cylindrical body with an open end for receiving said closure, and wherein said bead extends circumferentially about said cylindrical body near said open end.

8. The combination of claims 1, 2, 3, 4, 5, 6, or 7 wherein said connecting portion is rupturable and tears upon removal of said closure after being assembled on said container.

9. The combination of claim 8 wherein said connecting portion is a circumferentially extending web.

10. The combination of claims 2, 3, 4, 5, 6, and 7 wherein said interfitting means is constructed to permit said closure to be initially unscrewed without substantially restricting the rotation of said closure.

11. The combination of claims 6 and 7 wherein said band and said bead are constructed to permit said closure to be initially unscrewed without substantially restricting the rotation of said closure, and thereafter substantially restricting relative axial and rotary movements of said band whereupon said band is torn away from said skirt upon continued unscrewing of said closure.

12. In a closure for a container, said closure being of the type having a top and a circumferentially extending skirt depending from said top, the improvement comprising:
a circumferentially extending band integrally joined to the base of said skirt, having a first position wherein said band extends upwardly from the base of said skirt, and a second position reversed from said first position wherein said band extends downwardly from the base of said skirt.

13. The improvement of claim 12 wherein said band includes means for securing said band to said container.

14. The improvement of claim 13 wherein said means for securing comprises a hook portion on said band which engages a bead on said container.

15. The improvement of claim 12 wherein said band is integrally joined to said skirt by a relatively thin, circumferentially extending web.

16. The improvement of claim 15 wherein said band may be pivoted about said web between its first and second positions.

17. The improvement of claim 15 wherein said web is rupturable and wherein said skirt may be torn from said band at said web when said closure is removed after assembled on said container.

18. In a screw cap having a top and an internally threaded, circumferentially extending skirt depending from said top, the improvement comprising:
a reversible band integrally joined to the base of said skirt by a relatively thin web;
said band having a first position extending upwardly from the base of said skirt and a second, reversed position extending downwardly from the base of said skirt;
said band including a projection extending generally outwardly when said band is in said first position and which projects generally inwardly when said band is in said second, reversed position;
said web pivotally joining said band to said skirt for movement of said band between said first and second positions, and being rupturable so that upon rotation of said closure for removal of said closure from said container, said skirt will separate and tear from said band at said web and said band will remain substantially on said container.

19. In a closure for use with a container having a bead for securing said closure to said container:
a circumferentially extending, reversible member having a first position, and, when reversed, a second position for surrounding a portion of said container adjacent said closure when said closure is assembled in said container; and
a hook portion on said reversible member for interfitting with said bead when said closure is assembled on said container and said reversible member is in said second position, so that said hook portion becomes permanently secured to said container.

20. The closure of claim 19 wherein said hook portion includes an outwardly extending projection for engaging the underside of said bead.

21. In combination with a screw cap closure:
a circumferentially extending band;
a connecting portion integrally joining said band to said closure, said connecting portion having a reduced thickness relative to said band and said closure adjacent said band, said band being pivotal about said connecting portion from a first position to a second, reversed position in which said band may secure said closure to a container.

22. The closure of claim 21 wherein said connecting portion comprises a web.

23. The closure of claim 22 wherein said closure has a top panel and a skirt, and wherein said web joins said band to the base of said skirt.

* * * * *

UNITED STATES PATENT AND TRADEMARK OFFICE
CERTIFICATE OF CORRECTION

PATENT NO. : 4,291,813
DATED     : September 29, 1981
INVENTOR(S) : David O. Allen; Harry A. E. Wombold It is certified that error appears in the above-identified patent and that said Letters Patent are hereby corrected as shown below:

Col. 7, line 34, "and" should be ---or---.

Col. 7, line 38, "and" should be ---or---.

Signed and Sealed this

Fifteenth Day of December 1981

[SEAL]

Attest:

GERALD J. MOSSINGHOFF

*Attesting Officer*    *Commissioner of Patents and Trademarks*